Feb. 21, 1967 H. D. COOK 3,305,674
DEVICE FOR DETERMINING AN ANGLE FROM A SET OF
ORTHOGONAL COMPONENTS
Original Filed July 7, 1961 2 Sheets-Sheet 1

INVENTOR

*Herbert D. Cook*

BY *David Robbins*

ATTORNEY

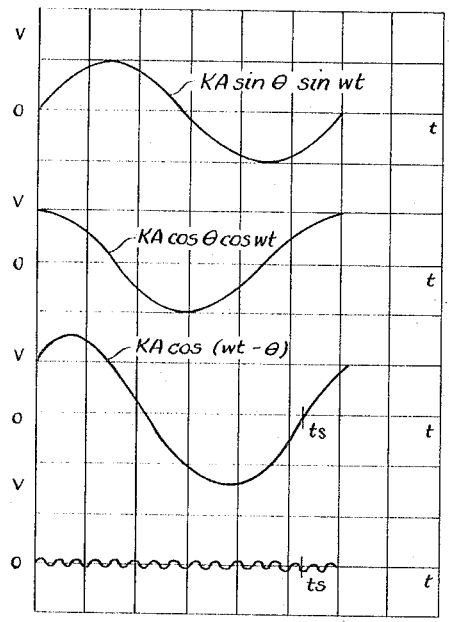
*Fig. 3A*
*Fig. 3B*
*Fig. 3C*
*Fig. 3D*
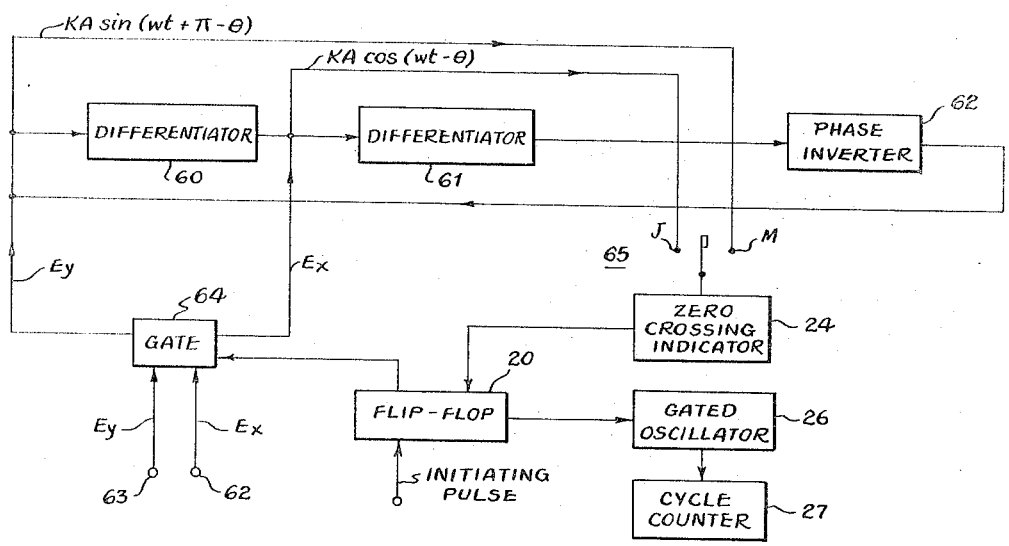
*Fig. 4*
INVENTOR
*Herbert D. Cook*
BY
ATTORNEY

3,305,674
DEVICE FOR DETERMINING AN ANGLE FROM A SET OF ORTHOGONAL COMPONENTS
Herbert D. Cook, Arlington, Va., assignor to the United States of America as represented by the Secretary of Commerce
Original application July 7, 1961, Ser. No. 122,600, now Patent No. 3,270,189, dated Aug. 30, 1966. Divided and this application Mar. 14, 1966, Ser. No. 535,658
8 Claims. (Cl. 235—189)

This application is a division of U.S. patent application Serial No. 122,600, now Patent No. 3,270,189, filed on July 7, 1961 by Herbert D. Cook.

This invention relates to an electrical device for indicating the angle of a radius vector when signals dependent upon a set of orthogonal components are applied thereto.

The systems in the prior art, used for measuring the angle of a radius vector when signals dependent upon a set of orthogonal components are known, employ electromechanical devices, such as resolvers or servomechanism and therefore are relatively slow in making computations.

Accordingly, it is an object of the present invention to provide a device, comprising primarily electrical and electronic components, for rapidly converting signals representing the orthogonal components of a point to a signal representing the angle of a radius vector drawn through the point.

This is accomplished by using a pair of signals having substantially constant magnitudes proportional to the $y$ and $x$ components, to generate a waveform, for example $kA \cos(\omega t - \theta)$, where $A = \sqrt{x^2 + y^2}$ and $k$ is an arbitrary constant. The phase difference between $kA \cos(\omega t - \theta)$ and $\cos \omega t$ is then measured to indicate the value of $\theta$.

In the figures:

FIGS. 3A to 3D are waveforms used in explaining the operation of the invention; and FIG. 4 is another embodiment of the invention.

Figure 1:
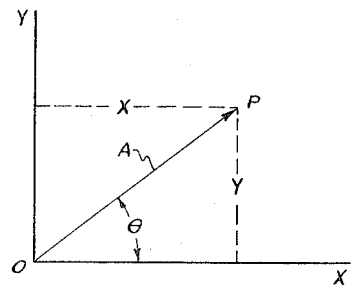
FIG. 1 is a vector diagram used in explaining the operation of the invention.

With reference to FIG. 1, point P is located on radius vector A which is drawn at an angle $\theta$ through the origin. The $x$ component of point P is equal to $A \cos \theta$, and the $y$ component is equal to $A \sin \theta$. The components are obtained as analog values from a system, not shown, in which their values are always related by the expression $$A = \sqrt{x^2 + y^2}$$

Figure 2:
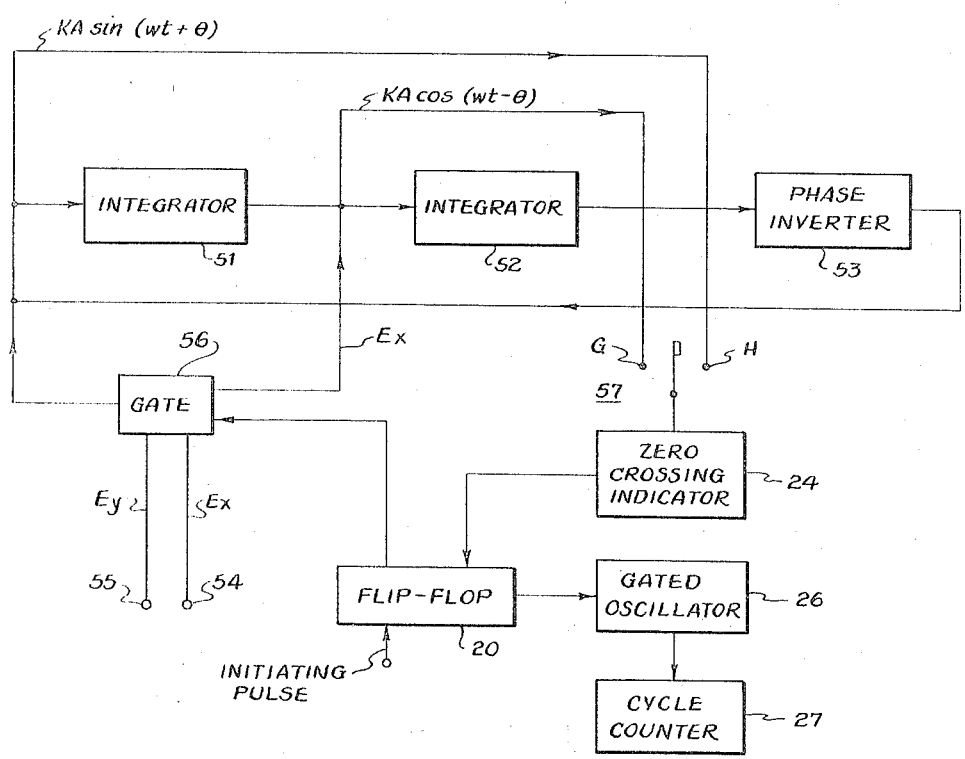
FIG. 2 is an embodiment of the invention.

In FIG. 2, a signal proportional to the $x$ component is used to generate a signal defined by $kA \cos \theta \cos \omega t$, where $k$ and $\omega$ are chosen arbitrarily. Simultaneously, the $y$ component is used to generate a signal defined by $kA \sin \theta \sin \omega t$ and the two signals are superimposed. The result may be expressed by the trigonometrical equation:

$$kA \cos \theta \cos \omega t + kA \sin \theta \sin \omega t = kA \cos(\omega t - \theta)$$

Since $\cos(\omega t - \theta)$ is a sinusoidal function whose phase with respect to $\cos \omega t$ varies directly with $\theta$, the difference in phase between $kA \cos(\omega t - \theta)$ and $\cos \omega t$ measured to determine the value of $\theta$.

More specifically, integrators 51, 52 and phase inverter 53 (FIG. 2) are connected in a loop and are selected so that the loop is in continuous oscillation when normally-closed gate 56 is open. The frequency of the oscillation is dependent upon the time constant of each integrator and voltage gain of the loop. It will be understood that the sinusoidal signal appearing at the input to integrator 51 leads the signal appearing at the output of the integrator by ninety electrical degress. Likewise, the phase shift through integrator 52 is $-90°$ and the phase shift through inverter 53 is $-180°$. Since the phase shift around the loop is $-360°$ and the total gain of the components in the loop is greater than unity, the loop forms a self-oscillating circuit.

If while normally-open gate 56 is closed, a substantially constant voltage $E_x$, having a magnitude proportional to $A \cos \theta$, is applied to terminal 54, the latter voltage is fed through the gate to the output of integrator 51. The output of the loop, developed on terminal G, will then be defined by $kA \cos \theta \cos \omega t$ (FIG. 3B), where $\omega$ is a function of the time constant of each integrator 51 and 52 and $kA \cos \theta$ is the amplitude coefficient of $\cos \omega t$. If the magnitude of voltage $E_x$ is zero and a substantially constant voltage $E_y$, having a magnitude proportional to $A \sin \theta$, is transmitted from terminal 55 through gate 56 to the input of integrator 51, the output of the loop, appearing on terminal G, will be defined by $kA \sin \theta \sin \omega t$ (FIG. 3A), where $kA \sin \theta$ is the amplitude coefficient of $\sin \omega t$. Since the components contained in the loop are linear, the superposition theorem holds, and if $E_x$ and $E_y$ are applied simultaneously to the input and output of integrator 51, respectively, the signal on terminal G will be defined by $kA \cos(\omega t - \theta)$.

In a typical operation, when $E_x$ and $E_y$ are applied to terminals 54 and 55, respectively, and an initiating pulse is applied at zero time $t_0$ to flip-flop 20, the latter pulse generates a signal that closes normally-open gate 56. If the arm of switch 57 is on terminal G, waveform $kA \cos(\omega t - \theta)$ appears on this terminal. The phase difference between waveforms $kA \cos(\omega t - \theta)$ and $\cos \omega t$ is then obtained by measuring the elapsed time between the initiating pulse $t_0$ and the first zero crossing of $kA \cos(\omega t - \theta)$ of a chosen slope. Hence, the waveform appearing on terminal G is applied to zero-crossing indicator 24 which provides a pulse at time $t_s$, when $kA \cos(\omega t - \theta)$ passes the zero axis from a negative to a positive polarity, as shown in FIG. 3C.

The initiating pulse, as stated above, is applied at time $t_0$ to flip-flop 20 which generates a signal that initiates the operation of gated oscillator 26, and the pulse at time $t_s$ is applied to the flip-flop which then generates a signal that terminates the operation of the oscillator. Cycle counter 27, connected to the output of the oscillator, counts the number of cycles generated in the time interval between $t_0$ and $t_s$ (FIG. 3D) that indicates the value of $\theta$. If, for example, the angular frequency of oscillator 26 is $N\omega$ and the count obtained is M, the value of the angle is $2\pi M/N$ radians or $360M/N$ degrees.

When the arm of switch 57 is on terminal H, waveform $kA \sin(\omega t + \theta)$ is applied to zero-crossing indicator 24 and the angle $\theta$ is measured in the manner just described.

With reference to FIG. 4, differentiators 60, 61 and phase inverter 62 are connected in a loop that is in continuous oscillation when normally-closed gate 64 is open. The frequency of oscillation is dependent upon the time constant of each differentiator and the voltage gain of the loop. It will be apparent that the sinusoidal signal, generated by the loop, is shifted 90° as it passes through differentiator 60. In a similar manner, the phase shift through differentiator 61 is 90° and the phase shift through inverter 62 is 180°. Because the phase shift around the loop is 360° and the total gain of the components in the loop is greater than unity, the loop forms a self-oscillating circuit. The frequency of the oscillation of the loop is dependent upon the time constant of each differentiator 60, 61 and the voltage gain of the loop.

Substantially constant voltages $E_x$ and $E_y$, having magnitudes proportional to $A \cos \theta$ and $A \sin \theta$, respectively, are applied to terminals 62, 63. $A \sin \theta$ and $A \cos \theta$ have values equal to those of the orthogonal components of point P in FIG. 1. At time $t_0$, an initiating pulse controls flip-flop 20 to provide a signal that closes normally-open gate 64. Voltage $E_y$ is then fed to the input and voltage $E_x$ to the output of differentiator 60. Simultaneously, the signal provided by the flip-flop is applied to gated oscillator 26, initiating operation of the oscillator.

When the arm of switch 65 is in contact with terminal J, waveform $kA \cos(\omega t - \theta)$ is applied to indicator 24; when the arm is in contact with terminal M, waveform $kA \sin(\omega t + \pi - \theta)$ is applied to the indicator. At time $t_s$, indicator 24 feeds a pulse to flip-flop 20 to generate a signal that opens gate 64 and terminates operation of oscillator 26. As in the embodiment in FIG. 2, counter 27 indicates the number of cycles occurring in the time interval between $t_0$ and $t_s$, which measures the angle $\theta$.

Obviously, many modifications and variations are possible in the light of the above teachings. For example, in FIG. 2 the waveforms applied to switch 57 could be derived from any one of several points in the loop comprising integrators 51, 52 and phase inverter 53, or voltage $E_x$ could be applied to the output and voltage $E_y$ to the input of integrator 51. In the latter case, the signals applied to switch 57 would have different waveforms than shown, but the results achieved would be essentially the same. It is therefore to be understood that within the scope of the appended claims, the invention may be practiced otherwise than as specifically described.

What is claimed is:

1. In a device for converting a first direct-current signal representing the $x$ component of a point and having a substantially constant magnitude proportional to $A \cos \theta$ and a second direct-current signal representing the $y$ component of the point and having a substantially constant magnitude proportional to $A \sin \theta$ to a signal having a value proportional to the value of the angle $\theta$ of a radius vector A drawn through the point:
    (a) means for generating a signal having an exponential sinusoidal transient waveform, said means having a first and second terminal positioned substantially ninety electrical degrees apart,
    (b) control means responsive to an initiating pulse for applying said first and second direct-current signal to said first and second terminal, respectively,
    (c) means for deriving from said first-mentioned means a sinusoidal signal of the type $\cos(\omega t - \theta)$ that is a function of $\omega t$ and $\theta$,
    (d) phase measuring means responsive to an initiating pulse and to said sinusoidal signal for providing an electrical signal having a value proportional to the value of $\theta$, and
    (e) means for applying said initiating pulse to said control means and to said phase measuring means, the occurrence of said initiating pulse representing the time from which said angle $\theta$ is measured.

2. The device set forth in claim 1 wherein:
    (a) the means recited in paragraph (b) comprises: a normally-open gate having a first and second output connected to said first and second terminal, respectively, a first and second input terminal connected to said gate, and means for applying said first and second direct-current signal to said first and second input terminal, respectively, and
    (b) said phase measuring means recited in paragraph (d) comprises: a zero-crossing indicator, means for applying said sinusoidal signal to the input of said zero-crossing indicator, a flip-flop circuit connected to the output of said zero-crossing indicator, means for applying an initiating pulse to said flip-flop circuit, a gated oscillator, means for applying the output of said flip-flop circuit to said gate and said oscillator, and a cycle counter connected to the output of said oscillator.

3. The device set forth in claim 1 wherein the circuit recited in paragraph (a) comprises:
    means for generating a signal having an exponential sinusoidal transient waveform, said means comprising: a first and second integrator, a first and second terminal and a phase inverter connected in a loop in such a manner that said loop is placed in oscillation when said first and second direct-current signals are applied to the first and second terminal, respectively.

4. The device set forth in claim 3 wherein:
    (a) the means recited in paragraph (b) comprises: a normally-open gate having a first and second output connected to said loop, a first and second input terminal connected to said gate, the first and second terminal, respectively, in said loop, a first and second input terminal connected to said gate, and means for applying said first and second direct-current signal to said first and second input terminal, respectively, and
    (b) said phase measuring means recited in paragraph (d) comprises: a zero-crossing indicator, means for applying said sinusoidal signal to the input of said zero-crossing indicator, a flip-flop circuit connected to the output of said zero-crossing indicator, means for applying an initiating pulse to said flip-flop circuit, a gated oscillator, means for applying the output of said flip-flop circuit to said gate and said oscillator, and a cycle counter connected to the output of said oscillator.

5. The device set forth in claim 3 wherein:
    (a) the means recited in paragraph (b) comprises: control means to responsive to an initiating pulse for applying said first and second direct-current signal to said first and second terminal, respectively,
    (b) said phase measuring means recited in paragraph (d) comprises: means responsive to an initiating pulse and to said sinusoidal signal for providing an electrical signal having a value proportional to the value of $\theta$, and
    (c) means for applying said initiating pulse to said control means and to said phase measuring means, the occurrence of said initiating pulse representing the time from which said angle $\theta$ is measured.

6. The device set forth in claim 1 wherein the circuit recited in paragraph (a) comprises:
    means for generating a signal having an exponential transient waveform, said means comprising: a first and second differentiator, a first and second terminal and a phase inverter connected in a loop in such a manner that said loop is placed in oscillation when said first and second direct-current signal are applied to the first and second terminal, respectively.

7. The device set forth in claim 6 wherein:
    (a) the means recited in paragraph (b) comprises: a normally-open gate having a first and second output connected to the first and second terminal, respectively, in said loop, a first and second input terminal connected to said gate, and means for applying said first and second direct-current signal to said first and second input terminal, respectively, and
    (b) said phase measuring means recited in paragraph (d) comprises: a zero-crossing indicator, means for applying said sinusoidal signal to the input of said zero-crossing indicator, a flip-flop circuit connected to the output of said zero-crossing indicator, means for applying an initiating pulse to said flip-flop circuit, a gated oscillator, means for applying the output of said flip-flop circuit to said gate and said oscillator, and a cycle counter connected to the output of said oscillator.

8. The device set forth in claim 6 wherein:
(a) the means recited in paragraph (b) comprises: control means responsive to an initiating pulse for applying said first and second direct-current signal to said first and second terminal, respectively,
(b) said phase measuring means recited in paragraph (d) comprises: means responsive to an initiating pulse and to said sinusoidal signal for providing an electrical signal having a value proportional to the value of $\theta$, and
(c) means for applying said initiating pulse to said control means and to said phase measuring means, the occurrence of said initiating pulse representing the time from which said angle $\theta$ is measured.

References Cited by the Examiner

UNITED STATES PATENTS 2,983,880 5/1961 McFadden _____ 235—183 X
3,068,467 12/1962 Grimaila.

OTHER REFERENCES

Moore: "Digital Phase Angle Meter Control," IBM Technical Disclosure Bulletin, volume 3 No. 2, page 35, July 1960.

MALCOLM A. MORRISON, *Primary Examiner.*

K. W. DOBYNS, I. KESCHNER, *Assistant Examiners.*